(No Model.)

E. A. P. HENNIG.
MEDICINE MEASURING BOTTLE.

No. 391,967. Patented Oct. 30, 1888.

Witnesses:
Carl Kay
Henry Huber

Inventor:
Ernst A. P. Hennig
by Jacques Raegener
Attorneys.

UNITED STATES PATENT OFFICE.

ERNST ALFRED PAUL HENNIG, OF DRESDEN, SAXONY, GERMANY.

MEDICINE-MEASURING BOTTLE.

SPECIFICATION forming part of Letters Patent No. 391,967, dated October 30, 1888.

Application filed July 13, 1888. Serial No. 279,833. (No model.)

*To all whom it may concern:*

Be it known that I, ERNST ALFRED PAUL HENNIG, of Dresden, Saxony, Germany, have invented certain new and useful Improvements in Medicine-Measuring Bottles, of which the following is a specification.

This invention relates to certain new and useful improvements in devices for measuring medicines, &c., which measuring device is also to be used for a stopper for the bottle.

The invention consists in a cup provided with a bulb-shaped hollow extension in communication with said cup, the cup serving as a stopper for the bottle and the extension as a gage or measure for the medicine.

Figure 1:
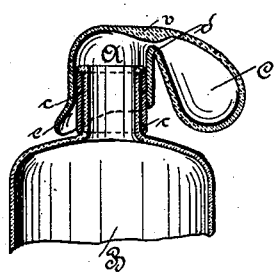
Figure 1A:
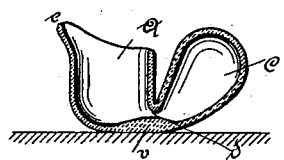
Figure 2:
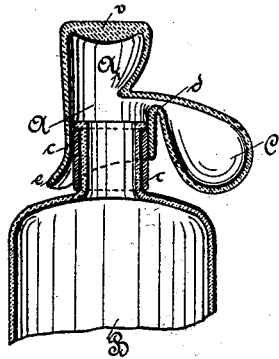
Figure 2A:
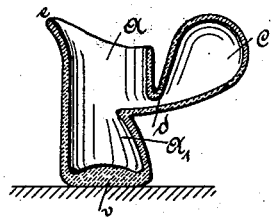
Figure 3:
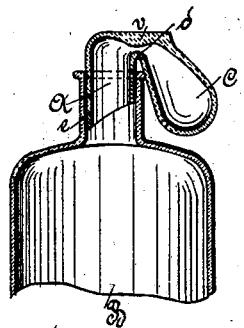
Figure 3A:
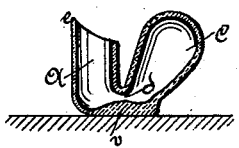

In the accompanying drawings, Figures 1, 2, and 3 are cross-sectional views of the upper parts of bottles and different constructions of my improved combined measuring device and stopper on said bottles. Figs. 1ª, 2ª, and 3ª are cross-sectional views of the different constructions of the combined measuring device and stopper, showing them inverted and in the position they have when the medicine is to be poured out of the same.

Similar letters of reference indicate corresponding parts.

The cup A, made of glass, metal, or other suitable material, is provided with a lip, e, and a bulb-shaped hollow extension, C, which is only in communication with the cup A at the bottom of the extension, said extension being inclined upward and outward, and the aperture d establishing communication between the cup A and the extension. The bottom of the cup A is thickened, as at v, for the purpose of weighting said bottom and giving the measuring device stability, and also for the purpose of furnishing a smooth under side for said bottom, so that when the measuring device is placed upon a support—such as a table, &c.—it will stand true and even and not be liable to tilt.

As shown in Figs. 1 and 2, the neck of the bottle B is provided with an outside packing, c, of cloth, rubber, or leather, against which the inner surfaces of the sides of the cup A fit snugly when said cup is placed in inverted position on the bottle-neck, and whereby the bottle is closed securely.

If desired, the diameter of the cup A may be less than that of the bottle-neck, so that the said cup can be placed into the neck for the purpose of closing the bottle, as shown in Fig. 3.

As shown in Figs. 2 and 2ª, the opening d, establishing communication between the cup A and extension C, may be arranged some distance above the bottom of the cup A.

The device is used in the following manner: The inverted cup is placed on or in the bottle-neck in the manner shown in Figs. 1, 2, or 3, and the bottle inclined so that the liquid flows from the same into the bulb-shaped extension C, which is of such size that when filled it contains a certain quantity of medicine—for example, a tea-spoonful, or a small table-spoonful, or a large table-spoonful, as may be desired. If the bottle is then placed in an upright position, the medicine remaining in the cup A and bottle-neck flows back into the bottle; but the required dose remains in the extension C. The measuring device is then removed from the bottle-neck and placed on its base, when the dose of medicine flows from the bulb-shaped extension C into the cup A, and can readily be poured into a cup or can be taken directly from the cup A.

When the extension C is connected with the cup A some distance above the bottom of said cup, all the medicine flows from the extension C into the bottom part, A', of the cup A, and none whatever remains in the extension C, whereas in the construction shown in Figs. 1ª and 3ª the medicine has about the same level in the cup and extension C when the measuring device is in the position for pouring the medicine out of the same.

If desired, the bottle-neck and measuring device may be provided with external or internal screw-threads to permit of screwing on the combined measuring device and stopper.

Having thus described my invention, I claim as new and desire to secure by Letters Patent—

1. A medicine-measuring device composed of a cup provided with a bulb-shaped extension in communication with the cup at a greater or less distance from the bottom of the same, substantially as herein shown and described.

2. A medicine-measuring device composed of a cup provided with a bulb-shaped extension in communication with the cup at a greater or less distance from the bottom of the same, the bottom of said cup being thickened, substantially as herein shown and described.

3. The combination, with a bottle, of a cup on the neck of the same and a hollow bulb-shaped extension on said cup, which extension is in communication with the cup, substantially as herein shown and described.

In testimony that I claim the foregoing as my invention I have signed my name in presence of two subscribing witnesses.

ERNST ALFRED PAUL HENNIG.

Witnesses:
  RUD. SOLMIDT,
  PAUL DRUCKMÜLLER.